United States Patent [19]

Koleske et al.

[11] Patent Number: 4,786,749

[45] Date of Patent: Nov. 22, 1988

[54] CARBOXYL-TERMINATED LACTONE ACRYLATES

[75] Inventors: Joseph V. Koleske, Charleston, W. Va.; George T. Kwiatkowski, Green Brook, N.J.

[73] Assignee: Union Carbide Corporation, Danbury, Conn.

[21] Appl. No.: 831,777

[22] Filed: Feb. 20, 1986

[51] Int. Cl.$^4$ .................. C08F 20/20; C08F 2/50; C07C 69/73; C07C 69/80

[52] U.S. Cl. .................................. 560/76; 522/93; 522/179; 526/318; 560/127; 560/185

[58] Field of Search .............. 560/90, 127, 76, 185

[56] References Cited

U.S. PATENT DOCUMENTS

| | | |
|---|---|---|
| Re. 29,131 | 2/1977 | Smith et al. |
| Re. 30,234 | 3/1980 | Sampson et al. ............ 525/162 |
| 3,367,992 | 2/1968 | Bearden ........................ 560/90 |
| 3,451,980 | 6/1969 | Brownstein ................... 560/90 |
| 3,455,802 | 7/1969 | D'Alelio ....................... 560/90 |
| 3,655,631 | 4/1972 | Fraser ........................ 260/78.3 R |
| 3,760,034 | 9/1973 | Critchfield et al. .......... 260/874 |
| 3,816,566 | 6/1974 | Critchfield et al. .......... 260/898 |
| 3,864,434 | 2/1975 | Critchfield et al. .......... 260/899 |
| 3,884,994 | 5/1975 | Critchfield et al. .......... 260/899 |
| 3,892,714 | 7/1975 | Sampson et al. .............. 260/77.5 |
| 4,000,218 | 12/1976 | Critchfield et al. .......... 260/858 |
| 4,034,017 | 7/1977 | Chang et al. ................. 260/829 R |
| 4,082,816 | 4/1978 | Fisk et al. .................... 260/855 |
| 4,171,423 | 10/1979 | Smith et al. ................... 528/289 |
| 4,188,472 | 2/1980 | Chang .......................... 525/75 |
| 4,188,477 | 2/1980 | Smith et al. ................... 528/288 |
| 4,192,789 | 3/1980 | Smith et al. ................... 260/29.2 |
| 4,195,160 | 3/1980 | Smith et al. ................... 528/297 |
| 4,281,172 | 7/1981 | Knopf ........................... 560/185 |
| 4,317,760 | 2/1982 | Tsuda et al. .................. 524/111 |
| 4,340,497 | 7/1982 | Knopf ........................... 252/188 |
| 4,421,885 | 12/1983 | Tsuda et al. .................. 524/295 |
| 4,439,599 | 3/1984 | Watanabe ...................... 528/80 |
| 4,504,635 | 3/1985 | Weber et al. .................. 525/450 |
| 4,525,258 | 6/1985 | Watanabe ...................... 522/33 |

FOREIGN PATENT DOCUMENTS 221841 12/1983 Japan.
2160534 12/1985 United Kingdom.

OTHER PUBLICATIONS

Nippon Kayaku—Chemical Abstracts, vol. 102:15124s, 1983.
Nippon Kayaku—Derwent Abstracts 84-033042/06, 1984.
Research Disclosure, No. 265, May 1986, Disclosure No. 26564, pp. 296–297.

Primary Examiner—John C. Bleutge
Assistant Examiner—Arthur H. Koeckert
Attorney, Agent, or Firm—Jean B. Mauro

[57] ABSTRACT

Lactone acrylates and organic anhydrides are condensed to form carboxyl-terminated lactone acrylates. These can be homopolymerized or copolymerized with ethylenically unsaturated monomers by means of radiation.

12 Claims, No Drawings

CARBOXYL-TERMINATED LACTONE ACRYLATES

BACKGROUND OF THE INVENTION

This invention pertains to lactone acrylates and more particularly to carboxyl-terminated lactone acrylates, their synthesis, and their polymerization products.

The preparation of certain caprolactone acrylate monomers was disclosed in U.S. Pat. No. 4,504,635 and a particular one is commercially available as TONET Monomer M-100 from Union Carbide Corporation. The following equation describes the preparation of such materials from the reaction of an hydroxyalkyl acrylate and epsilon-caprolactone:

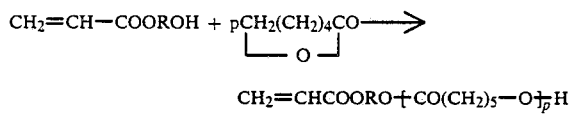

$$CH_2=CHCOORO+CO(CH_2)_5-O+_pH$$

wherein R is an alkylene radical having 2 to 12 carbon atoms and p is from 1 to about 20.

SUMMARY OF THE INVENTION

It has now been found that the reaction of a lactone acrylate with an organic anhydride or carboxylic acid compound affords a polymerizable monomeric carboxyl-terminated lactone acrylate having the following general formula:

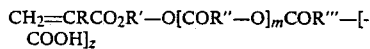

wherein R is H, methyl or ethyl, R' is an alkylene radical having 2 to about 12 carbons, R" is an alkylene radical having about 1 to about 10 carbons, R''' is a divalent radical having 2 to about 20, preferably 2 to about 12, carbons, m is an integer having a value of 1 to about 20, preferably 1 to about 10, most preferably 1 to 5, and z is an integer having a value of 1 to about 4, preferably 1 to 2. The monomeric structure depicted above is obtained by a process in which ester linkages are formed in the presence of other existing ester linkages without deleterious side reactions occurring. In addition, the structures are stable even though carboxylic acid groups are present and such groups are known to have an adverse effect, i.e., as for example cause hydrolysis or metastasis, on lactone-based products such as polyols.

In a preferred reaction scheme, the following equation results:

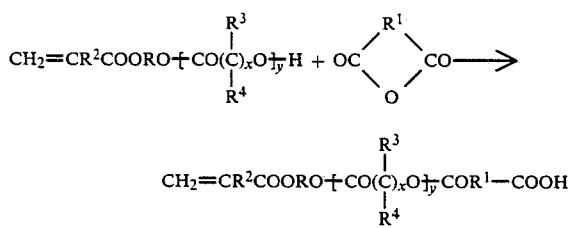

where R and $R^1$ are divalent radicals, $R^2$ is either hydrogen or methyl, each of $R^3$ and $R^4$ (which can be the same or different) is hydrogen, phenyl, or lower alkyl having 1 to about 6 carbon atoms, x is an integer having a value of up to about 10, and y is an integer having a value up to about 20.

Hydroxyalkyl acrylates useful for affording the starting lactone acrylate include:

hydroxyethyl acrylate
hydroxypropyl acrylate
hydroxybutyl acrylate
glycerine mono- or diacrylate
hydroxyethyl methacrylate
hydroxypropyl methacrylate
hydroxyhexyl methacrylate, and the like.

Representative lactones are represented by the formula:

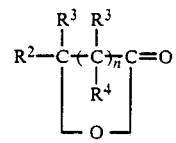

wherein each of $R^3$ and $R^4$ is hydrogen, phenyl, or lower alkyl having 1 to about 5 carbon atoms and n is 0 to about 9.

The preferred lactone is epsilon-caprolactone, although delta-valerolactone, delta-butyrolactone, beta-propiolactone zeta-enantholactone, and eta-caprylolactone can also be used, as well as methyl epsilon-caprolactone, dimethyl epsilon-caprolactone, epsilon-phenyl-alpha-methyl-epsilon caprolactone, and the like, as well as mixtures of such lactones.

The most preferred lactone acrylate used in this invention is that having the average formula

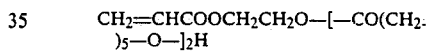

where 1 mole of hydroxyethyl acrylate combines with 2 moles of epsilon-caprolactone. This product can be prepared as disclosed in U.S. Pat. No. 4,504,635; however, similar reaction products of hydroxyalkyl acrylates and caprolactone prepared with catalysts such as stannous chloride, boron trifluoride, boron trifluoride etherate, dibutyltin oxide, stannous bromide, and the like, can be used.

The general reaction conditions for the conversion of lactone acrylates to carboxyl-terminated derivatives are as follows:

The lactone acrylate and anhydride or carboxylic acid compound are combined and allowed to react at temperatures of from room temperature to about 180° C. for periods of time ranging from less than an hour to several days, with the length of reaction time depending on the temperature employed. Both time and temperature will depend on the particular reactants used. The preferred reaction temperatures are from about 40° C. to 160° C. for less than an hour to about twenty-four hours, and the most preferred reaction temperatures are from about 60° C. to 140° C. for less than an hour to about eight hours. The reaction is preferably carried out in an oxygen-containing atmosphere which may be produced by blanketing the reactants with air, sparging the reactants with air, or by any other means that will introduce oxygen and inhibit reaction of the acrylate functionality. Although the reaction proceeds without an added catalyst, in certain instances it may be desirable to add a catalyst to promote the reaction and minimize the reaction time. Suitable catalysts are alkaline compounds such as tetramethylammonium bromide, trimethylbenzyl ammonium hydroxide, trimethylbenzylammonium ethoxide, trimethylbenzyl ammonium bromide and other quaternary ammonium compounds. It is desirable to add an inhibitor or free radical stabilizer to the reacting system to prevent gelation when oxygen alone is not sufficient for this purpose. A variety of quinones such as hydroquinone monomethyl ether, hydroquinone, alkyl- and aryl-substituted hydroquinone, p-methoxyphenol, and so on, can be used as free radical stabilizers. These inhibitors can be used in concentrations of from about 100 to 2000 ppm, preferably from 200 to 700 ppm, of the reactants. In many instances, the starting lactone acrylate will contain one or more of these inhibitors. If desired, an inert solvent or a reactive solvent can be used in the preparation of the carboxyl-terminated lactone acrylates. Inert solvents are such materials as toluene, 1,1,1-trichloroethane, ethoxyethanol acetate, and the like, and reactive solvents are various compounds such as 2-ethyl hexyl acrylate, 1,6-hexanediol diacrylate, trimethylolpropanetriacrylate, and the like.

The amount of polycarboxylic acid anhydride to be reacted with the caprolactone acrylate can be an amount sufficient to react with all of the hydroxyl groups; however, it may be desirable to use an amount of anhydride which is insufficient to react with all of the hydroxyl groups present in the caprolactone acrylate. This amount will vary and can be from about 0.1 to one anhydride equivalent or anhydride moiety for each hydroxyl equivalent or group present in the caprolactone acrylate, preferably from about 0.4 to one anhydride equivalent or anhydride moiety for each hydroxyl group present in the caprolactone acrylate, and more preferably from about 0.6 to one anhydride equivalent or anhydride moiety for each hydroxyl group. In a most preferred instance, one anhydride equivalent or anhydride moiety is charged for each hydroxyl equivalent or group initially present in the reaction mixture.

DESCRIPTION OF THE INVENTION

It has been found that novel, useful compounds can be prepared by reacting lactone acrylates, which are the reaction products of a lactone or mixture of lactones such as epsilon-caprolactone or a mixture of epsilon-caprolactone and epsilon-methyl-epsilon-caprolactone and a hydroxyalkyl acrylate such as hydroxyethyl acrylate or hydroxyethyl methacrylate, with an intramolecular polycarboxylic acid anhydride such as maleic anhydride. This reaction is depicted above in a generalized manner.

If desired, carboxylic acids can be reacted with the caprolactone acrylate via a condensation mechanism to yield monofunctional or polyfunctional compounds or mixtures thereof. These polyfunctional compounds can have single or multiple acrylate functionality and/or single or multiple carboxyl functionality. Specifically, when polyfunctional carboxylic acids are used, the resulting compound of this invention can have mono or multiple acrylate functionality and/or mono or multicarboxyl functionality. When monofunctional carboxylic acids or anhydrides, such as acetic anhydride, are used, the product will be an ester- or substituted ester-terminated molecule. However, the preferred reactant is an anhydride, which provides for more facile reaction conditions.

This compound and the other derivatives or adducts contemplated can be used in a variety of ways. For example, they can be used as radiation-curable monomers that will cure alone or in combination with other acrylates, diacrylates, triacrylates, multifunctional acrylates, vinyls, and the like, with various forms of radiation, such as ultraviolet light, electron beam radiation, gamma radiation, X-rays, etc. These latter types of polymers are cured at times in the presence of a photoinitiator that generates free radicals, such as benzophenone, benzoin ethers, diethoxyacetophenone, etc. Of course, in the case of electron beam radiation and similar types of radiation, it is not necessary to use a photoinitiator. Other means of polymerizing molecules known to those skilled in the art can be utilized, if desired. For example, the compounds of the invention can be cured alone or in combination with other reactants by thermal means. To facilitate thermal cure, a peroxide may be included in the formulated system.

Where used in a coating system, it may be desirable to add driers to the coating system. These driers can be of various types, such as cobalt naphthenate, manganese naphthenate, iron hexoate, calcium octoate, and the like.

The compounds and/or polymers of this invention are useful in a variety of coating, ink, adhesive, and sealant applications, as dispersants, as water dispersible/soluble materials, as hardeners, as tougheners, etc. Of course, it is readily apparent that the trifunctional molecules prepared from maleic anhydride and lactone acrylate monomers can be used in a wide variety of ways since they contain acrylate, maleate, and carboxyl functionality. In addition, high functionality unsaturated molecules can be prepared from polyfunctional anhydrides and the lactone acrylates.

The molecules of this invention that contain maleic anhydride residues can also be combined with styrene to form useful radiation-cure coatings.

They also can be used as thickeners for unsaturated polyester/styrene systems that contain magnesium oxide, etc., wherein they will also provide or augment low profile characteristics, and/or other properties. The compounds of this invention can be used as the only thickener or in combination with other thickeners, such as carboxyl-terminated caprolactone polyols, carboxyl-containing vinyl copolymers, and the like.

If desired, two molecules of lactone acrylate can be used in the above-depicted reaction of a lactone acrylate with an anhydride, with the second molecule reacting with the carboxyl group of the indicated reaction product via a condensation mechanism to yield a diacrylate. This can be used in various ways, such as a crosslinking agent for coatings and so on.

In another embodiment of this invention, the carboxyl-terminated lactone acrylates can be reacted with a variety of mono- or polyhydric alcohols to form the corresponding esters, which are useful as flexibilizers for radiation-cure formulations, in other uses that require acrylates, such as oligomers and polymers, and as high-boiling solvents. A variety of alcohols can be used, as for example, methanol, which would yield the methyl ester of the lactone acrylate, ethanol, which would yield the ethyl ester of the lactone acrylate, propanol, iso-propanol, n-butanol, s-butanol, i-butanol, t-butanol, and so on. Useful polyhydric alcohols would include glucose, sucrose, glycerol, sorbitol, inositol, and so on.

In a special embodiment of the invention, the lactone acrylate can be reacted with acetic anhydride to form the methyl ester of the lactone acrylate or it can be reacted with various monocarboxylic acids to form a variety of esters. Although such esters are not acid-terminated, they are useful as acrylates in the preparation of polymers or oligomers than may be crosslinked or that can be used in radiation curable systems. In general, such novel compounds are useful as flexibilizers.

While a preferred embodiment of the invention contains two molecules of caprolactone, on the average, per acrylate group, useful products can have from one to twenty or more caprolactone units per acrylate group, or can be a mixture of compounds that contain from one to about twenty or more lactone units. In addition, these units could be other lactones such as beta-propiolactone, delta-valerolactone, delta-butyrolactone, zeta-enantholactone, eta-caprylolactone, and so on, or substituted lactones such as 6-methyl-epsilon-caprolactone, 3-methyl-epsilon-caprolactone, 5-methyl-epsilon-caprolactone, 5-phenyl-epsilon caprolactone, 4-methyl-delta-valerolactone, 3,5-dimethyl-epsilon caprolactone, and so on, or copolymers of such lactones, such as a copolymer of epsilon-caprolactone and epsilon-methyl-epsilon caprolactone, of epsilon-caprolactone and eta-caprylolactone, of delta-valerolactone and epsilon-methyl-epsilon-caprolactone, and so on. In addition, combinations of lactones and oxides such as ethylene oxide, propylene oxide, butylene oxide, and so on, can be used to make the "lactone acrylate" compounds. Of course, when desired, the lactone acrylate can be prepared from one or more lactones alone or in combination with one or more of the described oxides. In an embodiment of the invention, the lactone acrylate can be prepared by reacting a hydroxyalkyl acrylate and a mixture of caprolactone, diacid—such as adipic acid, and diol—such as 1,6-hexane diol. Also useful in place of, or in addition to, diols are polyols, such as triols, tetrols, and so on. If desired, one or more oxides can be included in the reaction mixture. Further types of lactone acrylate will be those described above that have been end-capped with one or more moles of an alkylene oxide or of a tetrahydrofuran. For example, the caprolactone acrylate

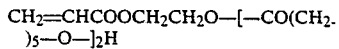

CH₂=CHCOOCH₂CH₂O—[—CO(CH₂-)₅—O—]₂H can be reacted with n molecules of ethylene oxide to produce the following molecule

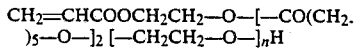

CH₂=CHCOOCH₂CH₂—O—[—CO(CH₂-)₅—O—]₂[—CH₂CH₂—O—]ₙH where n has a value of one to about ten or more. This oxide-capped molecule can be reacted with an anhydride to produce the molecules of this invention. If desired, before reacting the oxide-capped caprolactone acrylate with an anhydride, it could be further reacted with a lactone to form a block copolymer with alternating blocks that are the same or different in composition. Finally, the copolymeric acrylate would be reacted with an anhydride to produce the molecules of this invention.

Although a variety of lactones can be used, the preferred lactones to be used in the preparation of the caprolactone acrylates are epsilon-caprolactone and substituted epsilon-caprolactone. The most preferred lactone is epsilon-caprolactone.

The hydroxyalkyl acrylates that can be used to produce the lactone acrylate are 2-hydroxyethyl, 2-hydroxypropyl, 2-hydroxybutyl, 3-hydroxypropyl acrylate or methacrylate, diethylene glycol monoacrylate or monomethacrylate, glycerine or trimethylolpropane mono- or diacrylate or mono- or dimethacrylate, pentaerythritol mono-, di-, or triacrylate or mono-, di-, or trimethacrylate, glucose or sorbitol mono-, di-, tri-, tetra-, and penta-acrylate, or mono-, di-, tri-, tetra-, and pentamethacrylate, and the like. If desired, mixtures of one or more of these acrylates can be used in preparing the lactone acrylate of this invention.

Cyclic anhydrides of carboxylic acids are preferred for reaction with the lactone acrylates. However, if desired, mono- and polyfunctional carboxylic acids may be used wherein a condensation mechanism is employed. Anhydrides are preferred. Among the various anhydrides that can be used for the practice of this invention are maleic anhydride, succinic anhydride, phthalic anhydride, hexahydrophthalic anhydride, methyl tetrahydrophthalic anhydride, glutaric anhydride, cis- and trans-1,2-cyclohexane dicarboxylic anhydride, citraconic anhydride, itaconic anhydride, dodecenyl anhydride, isophthalic anhydride, hexachlorophthalic phthalic anhydride, chlorendic anhydride, trimellitic anhydride, pyromellitic anhydride, benzophenone tetracarboxylic acid dianhydride, naphthoic anhydride, norbornene dicarboxylic acid anhydride, acetic anhydride, acrylic anhydride, methacrylic anhydride, or any other intramolecular anhydride including those having one or more anhydride groups and those having substituents thereon such as halogen atoms, alkyl, alkoxy, or aromatic groups, nitro, carboxyl, aryl, or any other group that will not unduly interfere with the reaction. In addition, when desired, mixtures of one or more anhydrides and/or carboxylic acids can be used. When the products of this invention are prepared, from about 0.1 to about one equivalent of anhydride can be used per equivalent of hydroxyl and it is preferred to use about 0.4 to about one equivalent of anhydride per equivalent of hydroxyl, and it is preferred to use from 0.6 to one equivalent of anhydride per equivalent of hydroxyl. In a most preferred instance, one anhydride equivalent or anhydride moiety is charged for each hydroxyl equivalent or group initially present in the reaction mixture.

Illustrative of the monofunctional carboxylic acid compounds that can be used, one can name pentanoic acid, hexanoic acid, octanoic acid, caprylic acid, capric acid, hendecanoic acid, lauric acid, tridecanoic acid, pentadecanoic acid, stearic acid, arachidic acid, behenic acid, benzoic acid, cerotic acid, 2-ethylhexanoic acid, naphthoic acid, myristic acid, palmitic acid, oleic acid, linoleic acid, linolenic acid, oleostearic acid, levulinic acid, ricinoleic acid, cinnamic acid, and the like, and mixtures of such acids.

Illustrative of the polyfunctional carboxylic acids that can be used, one can mention oxalic acid, malonic acid, succinic acid, glutaric acid, adipic acid, suberic acid, azelaic acid, sebacic acid, brassylic acid, maleic acid, fumaric acid, itaconic acid, phthalic acid, isophthalic acid, terephthalic acid, trimellitic acid, tartaric acid, malic acid, mannaric acid, 1,4-cyclohexanedicarboxylic acid, 1,2-cyclohexanedicarboxylic acid, 1,4,5,6,7,7-hexachloro-5-norbornene-2,3-dicarboxylic acid, hexahydophthalic acid, galactaric acid, 4,5-cyclohexenedicarboxylic acid, 3,6-methylene- 4-cyclohexene-1,2-dicarboxylic acid, citric acid, and the like, as well as mixtures of these acids and mixtures of these acids with monocarboxylic acids. The carboxylic acids can be unsubstituted or they can be substituted with any group which will not significantly interfere with the reaction. Illustrative of suitable substituents are the halogens, nitro, alkoxy, alkyl, keto, and the like.

It is understood that by reacting acid chloride with lactone acrylates, certain products of this invention can also be made.

The anhydride-capped lactone acrylates of this invention can be used in many ways. These ways of utilizing the compounds include homopolymerization or copolymerization with a variety of other suitable acrylates, methacrylates, or other ethylenically unsaturated compounds that will undergo copolymerization by radiation reaction techniques. Suitable compounds for copolymerization include methyl, ethyl, propyl, isopropyl, butyl, isobutyl, secondary-butyl, tertiary-butyl, pentyl, neopentyl, isopentyl, hexyl, ethyl-hexyl, dodecyl, glycidyl, hydroxyalkyl, and so on, acrylates and methacrylates, acrylic and methacrylic acid, 2-polystyrylalkylmethacrylates as 2-polystyrylethylmethacrylate (Arco Chemical Co., Chemlink 4500), vinyl compounds such as vinyl acetate, vinyl chloride, styrene, acrylonitrile, methacrylonitrile, and the like, 1,6-hexanediol diacrylate, trimethylolpropane di- and triacrylate and methacrylate, pentaerythritol di-, tri-, and tetraacrylate, diethylene glycol diacrylate, esterdiol diacrylates, alkoxylated esterdiol diacrylates, caprolactone acrylates or methacrylates wherein caprolactone polyols (that are elsewhere described as in U.S. Pat. No. 3,169,945, for example) are esterified with acrylic or methacrylic acid, alkoxylated derivatives (i.e., end-capped) of the above-described caprolactone polyols that are esterified with acrylic or methacrylic acid, alkylene oxide polyols or monols that have been esterified with acrylic or methacrylic acid, reaction products of alkylene oxides with monols or polyols such as hydroxyalkyl acrylates or trimethylol propane, pentaerythritol, sorbitol, glucose, etc., that have been esterified with acrylic or methacrylic acid, poly(tetramethylene oxide) polyols that have been esterified with acrylic acid or methacrylic acid, epoxy acrylates, urethane acrylates, and the like.

A variety of photoinitiators can be utilized in the radiation-curing aspect of this invention. When acrylates or other unsaturated compounds are used, the usually used photoinitiators are the type that generate free radicals when exposed to radiation energy. Any of the known photoinitiators can be used. Illustrative of suitable photoinitiators one can mention 2,2-diethoxyacetophenone, 2- or 3- or 4-bromoacetophenone, 3- or 4-allyl-acetophenone, 2-acetonaphthone, benzaldehyde, benzoin, the alkyl benzoin ethers, benzophenone, benzoquinone, 1-chloroanthraquinone, p-diacetyl-benzene, 9,10-dibromoanthracene, 9,10-dichloroanthracene, 4,4-dichlorobenzophenone, thioxanthone, isopropyl-thioxanthone, methylthioxanthone, a, a, a,-trichloro-para-t-butyl acetophenone, 4-methoxybenzophenone, 3-chloro-8-nonylxanthone, 3-iodo-7-methoxyxanthone, benzaldehyde, carbazole, 4-chloro-4'-benzylbenzophenone, fluoroene, fluoroenone, 1,4-naphthylphenylketone, 1,3-pentanedione, 2,2-di-sec.-butoxy acetophenone, dimethoxyphenyl acetophenone, propiophenone, isopropylthioxanthone, chlorothioxanthone, xanthone, and the like, or any mixtures of these. The foregoing list is meant to be illustrative only and is not meant to exclude any suitable photoinitiators known to those skilled in the art. Those skilled in the art will know the concentrations at which photoinitiators are effectively employed and generally the concentration will not exceed 15 weight percent of the radiation-curable coating composition.

Those skilled in the art of photochemistry are fully aware that photoactivators can be used in combination with the aforementioned photoinitiators and that synergistic effects are sometimes achieved when such combinations are used. Photoactivators are well known in the art and require no further description to make known what they are and the concentrations at which they are effective. Nonetheless, one can mention as illustrative of suitable photoactivators, methylamine, tributylamine, methyldiethanolamine, 2-aminoethylethanolamine, allylamine, cyclohexylamine, cyclopentadienylamine, diphenylamine, ditolylamine, trixylylamine, tribenzylamine, n-cyclohexylethyleneimine, piperidine, N-methylpiperazine, 2,2-dimethyl-1,3-bis(3-N-morpholinyl)-propionyloxypropane, and the like, or any combination of these.

The formulations of this invention can be cured by ionizing or non-ionizing radiation means including, but not limited to, ultraviolet light, gamma radiation, and electron beam radiation. These curing methods and the equipment that can be used for them are well known to those skilled in the art. When the binder is to be cured by non-ionizing radiation, the presence of a photoinitiator therein is desirable. Suitable sources of radiation include mercury, xenon, carbon arc lamps, sunlight, radioactive sources, etc. Exposures may be from less than about 1 second to 10 minutes or more, depending upon the amounts of particular polymerizable materials and photoinitiator being utilized and depending upon the radiation source and distance from the source, and the thickness of the coating to be cured. The compositions may also be photopolymerized by exposure to electron beam radiation. Generally speaking the dosage necessary is from less than 1 megarad to 100 megarads or more.

The compositions of this invention may also include one or more thermoplastic resins free from any radiation-curable, unsaturated bond. Among useful thermoplastic resins for this purpose are vinyl chloride-vinyl acetate copolymers and other vinyl chloride resins, cellulose nitrate, cellulose acetate and other polyester resins, polyvinyl alcohol resins, and other cellulose derivatives, thermoplastic polyurethane resins, polyamide resins, polycaprolactone, polyvinylidene chloride, polyacrylates and other acrylic resins. The addition of such a thermoplastic resin is effective in balancing hardness, toughness, flexibility and other properties of the product, as well as providing sag control and viscosity control.

Although many radiation-cure coating systems are solvent-free, they may contain conventional solvents such as cyclohexanone, 1,1,1-trichloroethane, toluene, methyl isobutyl ketone, methyl amyl ketone, ethoxyethyl acetate, methylene chloride, and the like, and mixtures of these solvents, such as, for example a 2:2:1 mixture of methyl isobutyl ketone, toluene and cyclohexane.

The coating compositions may preferably include additives in conventional quantities, such as oils, particularly silicone oil, surfactants such as silicone-alkylene oxide copolymers, e.g., L-7604, L-7610, etc., commercially available from Union Carbide Corporation, silicone oil containing aliphatic epoxide groups, fluorocarbon surfactants such as FC-171 commercially available from 3M Commercial Chemicals Division and FC-430 and FC-431 also commercially available from 3M Commercial Chemicals Division, Modaflow commercially available from Monsanto Co., and other similar type compounds that are used to improve the flow and leveling characteristics of coatings.

In an aspect of the thermally-cured coatings portion of this invention, the anhydride-capped lactone acrylates of this invention can be combined with the various acrylates mentioned above and the free radical initiators, such as benzoyl peroxide, lauroyl peroxide, and the like, that yield free radicals when heated, to yield highly useful systems. In this case, no photoinitiators are necessary unless one wishes to combine thermal and radiation curing.

The coating compositions of this invention can contain various additives that are known to those skilled in the art. Such additives include, pigments, colorants, dyes, defoamers, thickeners, preservatives, mildew inhibitors, anti-sag agents, anti-settling agents, and the like.

The invention is further described in the examples which follow. All parts and percentages are by weight unless otherwise specified.

In the examples which follow, the cured coating compositions were evaluated according to the following procedures:

Forward Impact Resistance: a measure of the ability of a cured film coating to resist rupture from a falling weight. A Gardner Impact Tester using an eight-pound dart was used to test film coatings cast and cured on steel panels. The dart was raised to a given height in inches and dropped onto the coating side of the coated steel panel. The inches times pounds, designated inch-pounds, absorbed by the film without rupturing was recorded as the film's forward impact resistance.

Pencil Hardness (ASTM D-3363-74): pencil leads of increasing hardness values were forced against the film coating surface in a precisely defined manner until one pencil lead cut through the surface of the film coating. The surface hardness was considered as the hardest pencil grade which just failed to cut through the film coating surface. The pencil leads, in order of softest to hardest, were reported as follows: 6B, 5B, 4B, 3B, 2B, B, HB, F, H, 2H, 3H, 4H, 5H, 6H, 7H, 8H, and 9H.

Solvent Resistance: a measure of the resistance of the cured film to attack by acetone and was reported as the number of rubs or cycles of acetone-soaked cheesecloth required to remove one-half of a cured film from the test area. This test was performed by stroking the cured film with acetone-soaked cheesecloth until that amount of film coating was removed. The number of cycles required to remove this amount of coating was a measure of the coating's solvent resistance.

Reverse Impact Resistance: a measure of the ability of a cured film coating to resist rupture from a falling weight. A Gardner Impact Tester using an eight-pound dart was used to test film coatings cast and cured on steel panels. The dart was raised to a given height in inches and dropped onto the uncoated side of the coated steel panel. The inches times pounds, designated inch-pounds, absorbed by the film without rupturing was recorded as the film's reverse impact resistance.

Crosshatch Adhesion: a lattice pattern with either six or eleven cuts in each direction was made in the coating film to the substrate and pressure-sensitive adhesive tape was applied over the lattice pattern and then removed. The adhesion was evaluated by comparison with descriptions and illustrations, as more fully detailed in ASTM D-3359-78.

GLOSSARY OF MATERIALS USED IN EXAMPLES

1. TONE Monomer M-100. A caprolactone acrylate with an average molecular weight of about 344 and marketed by Union Carbide Corp.

2. Uvithane 893. A urethane acrylate marketed by Thiokol. It is a viscous liquid that has a viscosity of 900 to 2,200 poise at 120° F.

3. Irgacure 184. A free radical-generating photoinitiator that is marketed by Ciba-Geigy. It is stated to be 1-hydroxycyclohexyl phenyl ketone.

4. L-5410. A silicone/alkylene oxide copolymer formerly marketed under that designation by Union Carbide Corporation and now marketed as L-7610 under the SILWET trademark by Union Carbide Corporation.

5. L-7604 and L-7610 are silicone/alkylene oxide copolymers marketed by Union Carbide Corporation. The silicone/alkylene oxide polymers are modified dimethylpolysiloxanes.

6. Esterdiol 204. A methylolated proprionate diol marketed by Union Carbide Corporation.

EXAMPLE 1

One hundred grams of TONE Monomer M-100 were added to a 300 milliliter reaction flask equipped with a stirrer, air inlet and an air outlet, and a thermometer. The M-100 was heated to 110° C. with stirring and an air blanket. When the flask temperature reached 100° C., 24.7 grams of succinic anhydride were added slowly to avoid an exothermic reaction. Addition of the anhydride lowered the temperature about 7° C. The mixture of chemicals was heated for four hours at 117°–120° C. and at 130° C. for one hour. The product was cooled and stored. Analysis indicated that it had an acid number of 124, which would correspond to an average molecular weight of 452, which is quite close to the theoretical molecular weight of 444 for the expected product.

EXAMPLE 2

Forty-nine grams of maleic anhydride and 172 grams of M-100 monomer were combined in a glass, four-neck reaction flask equipped with a thermometer, stirrer, an air inlet and an air outlet. The reactants were heated for four hours at 125° C., an hour at 125° to 144° C., and 3.5 hours at 130° to 135° C. The product was cooled to room temperature and the acid number was found to be 115. Its viscosity was 560 cp when measured at 60 rpm with a UK LV8 viscometer and a #7 spindle.

EXAMPLES 3 to 7

The ingredients shown in Table I were placed in amber-colored, glass bottles, mixed well and cast onto Bonderite 37 steel panels with a No. 20 wire-wound rod and cured with a 300 watt/inch Fusion Systems ultraviolet light curing unit. Properties of cured film and plaques are also shown in Table I.

TABLE I

| | Example | | | | |
|---|---|---|---|---|---|
| | 3 | 4 | 5 | 6* | 7 |
| Ingredients | | | | | |
| Example 2 Product | — | — | 2.00 | — | 10.0 |
| M-100 Monomer | — | 2.00 | — | 10.0 | — |

TABLE I-continued

|  | Example | | | | |
|---|---|---|---|---|---|
|  | 3 | 4 | 5 | 6* | 7 |
| Tetraethylene glycol diacrylate | 4.00 | 3.20 | 3.20 | — | — |
| Uvithane 893 | 6.00 | 4.80 | 4.80 | — | — |

TABLE II

|  | Example | | | | | | | | | | | | |
|---|---|---|---|---|---|---|---|---|---|---|---|---|---|
|  | 8 | 9 | 10 | 11 | 12 | 13 | 14 | 15 | 16 | 17 | 18 | 19 | 20 |
| Ingredients | | | | | | | | | | | | | |
| M-100 Monomer | 1.00 | 2.00 | 3.00 | 4.00 | — | — | — | — | — | — | 2.00 | — | 10.0 |
| Example 2 Product | — | — | — | — | 1.00 | 2.00 | 3.00 | 4.00 | 1.28 | 3.85 | — | 2.00 | 2.00 |
| 13379-83-3** | | | | | | | | | — | — | 3.00 | 3.00 | 2.00 |
| 44-OWS-52*** | | | | | | | | | — | — | — | — | 2.00 |
| Acetoner C-488+ | | | | | | | | | — | — | — | — | 2.00 |
| TMP-Triacrylate* | 9.00 | 8.00 | 7.00 | 6.00 | 9.00 | 8.00 | 7.00 | 6.00 | 9.00 | 7.00 | 5.00 | 5.00 | 1.00 |
| Irgacure 184 | 0.20 | 0.20 | 0.20 | 0.20 | 0.20 | 0.20 | 0.20 | 0.20 | 0.20 | 0.20 | 0.20 | 0.20 | 0.20 |
| L-5410 | | | | ←0.04→ | | | | | | | ←0.04→ | | |
| Properties After Cure* | | | | | | | | | | | | | |
| Double Acetone Rubs | >100 | >100 | >100 | >100 | >100 | >100 | >100 | >100 | >100 | >100 | >100 | >100 | >100 |
| Pencil Hardness | 5H | 4H | H | H | 5H | 4H | 3H | 4H | 4H | 4H | 3H | 5H | H |
| Percent Adhesion | 90 | 85 | 95 | 90 | 99 | 98 | 98 | 98 | 98 | 99 | 98 | 98 | 10 |
| Gardner Impact | | | | | | | | | | | | | |
| Direct, in. lbs | 10 | 15 | 15 | 15 | 15 | 15 | 15 | 15 | 15 | 25 | 25 | 25 | 25 |
| Reverse, in. lbs | <5 | <5 | <5 | <5 | <5 | <5 | <5 | <5 | <5 | <5 | <5 | <5 | <5 |

*Trimethylolpropane triacrylate.
**TONE-0405 tetraacrylate. [The reaction product of 4 moles of acrylic acid and one mole of a 540 molecular weight caprolactone triol
***(TONE-0305)] M-100 that has been end-capped with methyl isocyanate.
+Diacrylate of the four-mole ethoxylate of Esterdiol-204.

| Irgacure 184 | 0.40 | 0.40 | 0.40 | 0.40 | 0.40 |
|---|---|---|---|---|---|
| L-5410 | 0.05 | 0.05 | 0.05 | 0.05 | 0.05 |
| Properties After Cure | | | | | |
| Double Acetone Rubs | >100 | >100 | >100 | 40 | 50 |
| Pencil Hardness | H | H | 2H | <6B | 6B |
| Gardner Impact | | | | | |
| Direct, in. lbs. | 275 | 150 | 250 | 320 | 200 |
| Reverse, in. lbs. | 200 | 125 | 225 | 320 | 100 |

*This was a very soft system that had a rubbery, high-friction feel after cure.

From these data, it is apparent that the product of Example 2 improves the hardness of the urethane acrylate system (Example 5 vs. Example 3) more than the TONE Monomer M-100 (Example 3 vs. Example 4). In addition, the product of Example 2 has effectively not altered the impact resistance of the urethane acrylate whereas the M-100 has caused a marked decrease in impact characteristics. Thus, the product of Example 2 achieved both an increase in hardness and in flexibility/impact resistance which is not expected, in that one property usually decreases when the other property increases. The improvement in hardness is apparent when the data of Examples 6 and 7 are compared. The homopolymer of TONE Monomer M-100 is <6B in hardness, indicating a very soft coating, whereas the homopolymer of the Example 2 product (Example 7) is 6B in hardness. Although it is readily apparent that there is an improvement of the Example 7 coating over that of Example 6 coating, to emphasize this difference, the systems of Examples 6 and 7 were subjected to 5 passes under the ultraviolet light source. After this treatment, the coating of Example 6 was still <6B in hardness, whereas the coating of Example 7 was 4B in hardness, indicating that there was at least a "three-pencil" hardness difference in the coatings.

EXAMPLES 8-20

In the same manner as described in Examples 3 to 7, the systems shown in Table II were prepared, cured, and tested. The cured coatings were then evaluated, and they had the properties described below. The purpose in these studies (Ex. 8-15 and 18/19) was to demonstrate that the newly developed product of Example 2 did not decrease hardness of a very hard, radiation-cured system as much as M-100 monomer. The other examples are for the purpose of demonstrating that useful radiation-cured products can be derived from the Example 2 product and a variety of other acrylates.

It is apparent from the above data that the product of Example 2 is much more effective in maintaining hardness than other additives such as M-100 monomer. This is especially apparent when Examples 10 and 11 are compared with Examples 14 and 15, and when Examples 18 and 19 are compared.

EXAMPLE 21

Ninety-eight grams of maleic anhydride and 344 grams of TONE Monomer M-100 were combined in a glass, four-neck reaction flask equipped with a thermometer, a stirrer, an air inlet and an air outlet. The reactants were heated for 9.75 hours at 130° to 137° C. The product was then cooled to room temperature and the acid number was found to be 115. The product had a viscosity of 556 cp when measured at 30 rpm with a UK LVB viscometer equipped with a #6 spindle.

EXAMPLES 22-27

The ingredients shown in Table III were placed in amber-colored, glass bottles, mixed well, and cast onto Bondrite #37 steel panels with a #20 wire-wound rod, and cured using one, three or five passes under a 300 watt per inch Fusion Systems ultraviolet light curing unit.

TABLE III

|  | Examples | | | | | |
|---|---|---|---|---|---|---|
|  | 22 | 23 | 24 | 25 | 26 | 27 |
| Ingredients | | | | | | |
| Example 21 Product | 3.00 | 3.00 | 3.00 | 5.00 | 5.00 | 5.00 |
| TMP Triacrylate | 7.00 | 7.00 | 7.00 | 7.00 | 7.00 | — |
| Irgacure 184 | 0.20 | 0.30 | 0.50 | 0.30 | 0.50 | 0.25 |
| L-7604 | 0.04 | 0.04 | 0.04 | 0.04 | 0.04 | 0.02 |
| Properties After One-Pass Cure | | | | | | |
| Double Acetone Rubs | >100 | >100 | >100 | >100 | >100 | 25 |

TABLE III-continued

| | Examples | | | | | |
|---|---|---|---|---|---|---|
| | 22 | 23 | 24 | 25 | 26 | 27 |
| Pencil Hardness | H | 2H | 4H | 2H | 3H | <6B |
| % X-Hatch Adhesion | 0 | 15 | 5 | 35 | 0 | 100 |
| Gardner Impact | | | | | | |
| Direct, in. lbs | 15 | 15 | 15 | 25 | 25 | 75 |
| Reverse, in. lbs | <5 | <5 | <5 | <5 | <5 | 50 |
| Properties After Three-Pass Cure | | | | | | |
| Double Acetone Rubs | >100 | >100 | >100 | >100 | >100 | 29 |
| Pencil Hardness | 3H | 4H | 4H | 4H | 3H | <6B |
| % X-Hatch Adhesion | 25 | 50 | 30 | 30 | 12 | 100 |
| Gardner Impact | | | | | | |
| Direct, in. lbs | 15 | 15 | 15 | 25 | 25 | 75 |
| Reverse, in. lbs | <5 | <5 | <5 | <5 | <5 | 50 |
| Properties After Five-Pass Cure | | | | | | |
| Double Acetone Rubs | >100 | >100 | >100 | >100 | >100 | 35 |
| Pencil Hardness | 4H | 4H | 4H | 4H | 3H | 3B |
| % X-Hatch Adhesion | 90 | 90 | 50 | 90 | 16 | 100 |
| Gardner Impact | | | | | | |
| Direct, in. lbs | 15 | 15 | 15 | 25 | 25 | 75 |
| Reverse, in. lbs | <5 | <5 | <5 | <5 | <5 | 50 |

These examples demonstrate that systems containing the maleic anhydride adduct of a caprolactone acrylate respond to both increasing levels of photoinitiator and increasing levels of radiation or multiple passes under the light source. Variables such as these are altered when system/cure is optimized. Properties of the systems improve as either of these variables is increased.

EXAMPLES 28–33

The ingredients shown in Table IV were combined in a glass, four-neck reaction flask equipped with a thermometer, a stirrer, an air inlet and an air outlet. The reactants were heated at the indicated temperatures for the indicated times. An air flow, which blanketed the reacting ingredients was maintained during the entire reaction time. The reactants were cooled and the final acid number and viscosity were determined.

TABLE IV

| | Example | | | | | |
|---|---|---|---|---|---|---|
| Ingredients | 28 | 29 | 30 | 31 | 32 | 33 |
| Maleic Anhydride | 39.2 | 24.5 | 49.0 | 19.6 | 9.6 | 49.0 |
| Phthalic Anhydride | 14.8 | 37.0 | — | — | — | — |
| M-100 Monomer | 172.0 | 172.0 | — | — | — | — |
| Caprolactone Acrylate* | — | — | — | 160.0 | — | — |
| Caprolactone Acrylate** | — | — | — | — | 251.2 | — |
| Placcel FM-2+ | — | — | 179.0 | — | — | — |
| Placcel FM-1++ | — | — | — | — | — | 122.0 |
| Reaction Time, hr. | 3 | 2 | 2.25 | 1.50 | 4.0 | 1.0 |
| Reaction Temp. °C. | 125 | 125 | 125 | 125 | 125 | 125 |
| Acid No. | 121.2 | 121.3 | 125.1 | 56.2 | 48.6 | 147.8 |
| Viscosity, 25° C. cp | 630 | 860 | 490 | Solid | Solid | 280 |

*The reaction product of 6 moles of epsilon-caprolactone and one mole of HEA.
**The reaction product of 10 moles of epsilon-caprolactone and one mole of HEA.
+The two-mole caprolactone adduct of hydroxyethylmethacrylate, sold by Daicel.
++The one-mole caprolactone adduct of hydroxyethylmethacrylate, sold by Daicel.

The products of these examples demonstrate the preparation of a variety of carboxyl-terminated acrylate monomers. Examples 28 and 29 are examples of products prepared from mixtures of an unsaturated anhydride (maleic) and a saturated anhydride (phthalic). Such products can be used to alter the final degree of crosslinking of systems in which they are utilized. The products of Examples 31 and 32 are based on relatively high molecular weight caprolactone acrylates and are for systems in which a high degree of flexibility or other specialized property is desired. These long-chain molecules will provide a plasticizing, softening, or other special effect when used in a variety of systems that can be cured by radiation or heat. Examples 30 and 33 demonstrate that carboxyl-functional methacrylates can be prepared. These methacrylates will usually provide higher hardness along with flexibility than the corresponding acrylates.

EXAMPLES 34–42

The ingredients shown in Table V were placed in glass bottles and well mixed. They were then coated onto Bonderite 37 steel panels with a No. 20 wire-wound rod and exposed to a 300 watt/inch ultraviolet light source at 10 fpm.

TABLE V

| | Example | | | | | | | | |
|---|---|---|---|---|---|---|---|---|---|
| | 34 | 35 | 36 | 37 | 38 | 39 | 40 | 41 | 42 |
| Ingredients | | | | | | | | | |
| Example 21 Product | — | — | 5.0 | — | — | — | — | — | — |
| Example 28 Product | 10.0 | — | — | 5.0 | — | — | — | — | — |
| Example 29 Product | — | 10.0 | — | — | 5.0 | 4.0 | — | — | — |
| Example 31 Product | — | — | — | — | — | — | — | 10.0 | 3.5 |
| TMP-Triacrylate | — | — | 5.0 | 5.0 | 5.0 | — | — | — | 6.5 |
| 1,6-Hexanedioldiacrylate | — | — | — | — | — | 6.0 | 6.0 | — | — |
| M-100 | — | — | — | — | — | — | 4.0 | — | — |
| Irgacure 184 | 0.5 | 0.5 | 0.5 | 0.5 | 0.5 | 0.5 | 0.5 | 0.5 | 0.5 |
| L-7604 | 0.04 | 0.04 | 0.04 | 0.04 | 0.04 | 0.04 | 0.04 | 0.04 | 0.04 |
| Properties After Cure | | | | | | | | | |
| Acetone Double rubs | 15 | 14 | >100 | >100 | >100 | >100 | >100 | 12 | >100 |
| Pencil Hardness | 6B | 6B | H | H | H | F | 3B | 6B | H |
| % X-Hatch Adhesion | 100 | 100 | 0 | 0 | 0 | 0 | 0 | 0 | 0 |
| Gardner Impact | | | | | | | | | |
| Direct, in. lbs. | 50 | 75 | 25 | 25 | 25 | 25 | 25 | 320 | 15 |
| Reverse, in. lbs. | 50 | 50 | <5 | <5 | <5 | <5 | <5 | 175 | <5 |

The results indicate that the carboxyl-terminated acrylates do respond to polymerization when subjected to UV light in the presence of a free radical-generating photoinitiator. Examples 36, 37, and 38 indicate that similar properties are obtained when either the phthalate/maleate acrylate mixture or the maleate acrylate alone is used in the particular system investigated. (Results may be different when these products used are in other formulated systems.) Examples 39 and 40 compare the results obtained when a system containing a caprolactone acrylate (Ex. 40) is compared with a mixed phthalate/maleate caprolactone acrylate (Ex. 39). It is readily apparent that a significantly harder coating is obtained with the Ex. 39 system.

EXAMPLES 43-51

The examples shown in Table VI describe the combination and radiation (ultraviolet light) cure of carboxyl-terminated caprolactone acrylates prepared in previous examples and other acrylates such as the diacrylate 1,6-hexanediol diacrylate (HD Diacrylate), the triacrylate trimethylolpropane triacrylate (TMP triacrylate), and an epoxy acrylate (Celrad 3700*) or mixtures of such acrylates. The ingredients listed were placed in glass bottles and well mixed. They were warmed to rapidly effect dissolution of the Irgacure 184 photoinitiator.

*An epoxy acrylate sold by Celanese. It is described by the manufacturer as "a high viscosity (about 1,000,000 cp) diacrylate ester of a bisphenol A epoxy resin."

The solutions were then coated onto Bonderite 37 steel panels with a #20 wire-wound rod and exposed to a 300 watt per inch ultraviolet light source at 10 fpm.

tion time. The reactants were cooled and the final acid number and viscosity were determined.

The examples described use the following ingredients in the equivalent ratios indicted.

Example 52: 0.25 equivalent of M-100 and 0.25 equivalent of methyltetrahydrophthalic anhydride.
Example 53: 0.25 equivalent of M-100 and 0.25 equivalent of hexahydrophthalic anhydride.
Example 54: 0.25 equivalent of M-100 and 0.25 equivalent of phthalic anhydride.
Example 55: 0.375 equivalent of M-100 and 0.125 equivalent of hexahydrophthalic anhydride and 0.25 equivalent of phthalic anhydride.

TABLE VII

|  | Example | | | |
|---|---|---|---|---|
|  | 52 | 53 | 54 | 55 |
| Ingredients | | | | |
| Methyltetrahydrophthalic Anhydride | 41.25 | — | — | — |
| Hexahydrophthalic Anhydride | — | 38.50 | — | 19.25 |
| Phthalic Anhydride | — | — | 37.0 | 37.0 |
| M-100 Monomer | 86.0 | 86.0 | 86.0 | 129.0 |
| Reaction Conditions | | | | |
| Reaction Time, hr. | 3 | 2.5 | 1 | 3.5 |
| Reaction Temperature, °C. | 115 | 130 | 125 | 125 |
| Analysis | | | | |
| Acid Number | 109 | 115 | 107 | 114 |
| Viscosity, cp (25° C.) | 40790 | 1870 | 1263 | 1690 |

TABLE VI

|  | Example | | | | | | | | |
|---|---|---|---|---|---|---|---|---|---|
|  | 43 | 44 | 45 | 46 | 47 | 48 | 49 | 50 | 51 |
| Ingredients | | | | | | | | | |
| Example 29 Product | — | — | — | — | — | — | — | — | 2.50 |
| Example 30 Product | 9.46 | — | — | — | — | — | — | — | — |
| Example 31 Product | — | 5.5 | — | — | — | — | 2.50 | — | — |
| Example 32 Product | — | — | 9.46 | — | 3.50 | — | — | 2.50 | — |
| Example 33 Product | — | — | — | 9.46 | — | — | — | — | — |
| TMP Triacrylate | — | 4.5 | — | — | 6.5 | — | — | — | — |
| HDD Diacrylate | — | — | — | — | — | 2.46 | 1.81 | 1.81 | 1.81 |
| Celrad 3700 | — | — | — | — | — | 7.0 | 5.15 | 5.15 | 5.15 |
| Irgacure 184 | 0.50 | 0.50 | 0.50 | 0.50 | 0.50 | 0.50 | 0.50 | 0.50 | 0.50 |
| L-7604 | 0.04 | 0.04 | 0.04 | 0.04 | 0.04 | 0.04 | 0.04 | 0.04 | 0.04 |
| Properties After Cure | | | | | | | | | |
| Acetone Dbl Rubs | 12 | >100 | 10 | 25 | >100 | >100 | >100 | >100 | >100 |
| Pencil Hardness | 6B | 2B | 6B | 6B | H | H | H | H | H |
| % X-Hatch Adhesion | 100 | 0 | 100 | 100 | 0 | 0 | 0 | 0 | 0 |
| Gardner Impact | | | | | | | | | |
| Direct, in. lbs. | 320 | 15 | 320 | 320 | 25 | 25 | 25 | 25 | 25 |
| Reverse, in. lbs. | 320 | <5 | 320 | 200 | <5 | <5 | <5 | <5 | <5 |

These results indicate that the carboxyl-terminated acrylates of this invention do respond to polymerization when subject to UV light in the presence of a free radical photoinitiator. The results further indicate that the compounds of the invention can be combined with other commercially available acrylates and the resultant combinations yield well-cured coating systems that would be useful in a variety of ways, e.g., in coatings, inks, adhesives, and sealants. It is expected that the carboxyl functionality of the compounds of this invention will improve the pigment dispersion qualities of other acrylates and thus will have utility as pigment dispersion aids.

EXAMPLES 52-55

The ingredients listed in Table VII were combined in a glass, four-neck reaction flask equipped with a thermometer, a stirrer, and an air inlet and outlet. The reactants were heated at the indicated temperatures for the indicated times. An air flow, which blanketed the reacting ingredients, was maintained during the entire reac- These examples described the preparation pf a variety of carboxyl-terminated caprolactone acrylate monomers, including preparation of a mixed anhydride-capped adduct.

EXAMPLES 56-60

These examples describe the blending and radiation curing of mixtures of a carboxyl-terminated caprolactone acrylate and the non-acrylate, ethylenically unsaturated compounds styrene and vinyl pyrrolidone. Example 27 is repeated since it functions as a control with no styrene or vinyl pyrrolidone.

The ingredients shown in Table VIII were placed in amber-colored, glass bottles, mixed well, and cast onto Bonderite 37 steel panels with a #20 wire-wound rod. The liquid coatings were then cured with one pass under a 300 watt per inch Fusion Systems ultraviolet light curing unit.

TABLE VIII

| | Example | | | | | |
|---|---|---|---|---|---|---|
| | 27 | 56 | 57 | 58 | 59 | 60 |
| Ingredients | | | | | | |
| Example 21 Product | 5.00 | 8.5 | 7.5 | 7.5 | 9.0 | 8.5 |
| Styrene | — | 1.0 | 2.0 | 1.5 | — | — |
| Vinyl pyrrolidone | — | — | — | 0.5 | 0.5 | 1.0 |
| Irgacure 184 | 0.25 | 0.5 | 0.5 | 0.5 | 0.5 | 0.5 |
| L-7610 | 0.04 | 0.04 | 0.04 | 0.04 | 0.04 | 0.04 |
| Properties After Cure | | | | | | |
| Acetone Dbl Rubs | 25 | 35 | 35 | 35 | 35 | 35 |
| Pencil Hardness | <6B | <6B | 5B | 4B | <6B | 4B |
| % X-Hatch Adhesion | 100 | 100 | 100 | 100 | 100 | 100 |
| Gardner Impact | | | | | | |
| Direct, in. lb. | 75 | 75 | 100 | 100 | 100 | 100 |
| Reverse, in. lb. | 50 | 50 | 75 | 100 | 25 | 25 |

These examples demonstrate that the ethylenically unsaturated compounds styrene and vinyl pyrrolidone can be reacted with the carboxyl-terminated caprolactone acrylates of this invention and that they can be used to alter the hardness, solvent resistance, and impact resistance of the cured compounds of this invention.

EXAMPLES 61–72

These examples, shown in Table IX, compare the cured properties of formulations that contain carboxyl-terminated caprolactone acrylates (Examples 61, 63, 65, 66, 69, and 70) with those of formulations that contain the starting point caprolactone acrylates (Examples 62, 64, 67, 68, 71, and 72) that were used to make to carboxyl-terminated products of this invention.

TABLE IX

| | Example | | | | | | | | | | | |
|---|---|---|---|---|---|---|---|---|---|---|---|---|
| | 61 | 62 | 63 | 64 | 65 | 66 | 67 | 68 | 69 | 70 | 71 | 72 |
| Ingredients | | | | | | | | | | | | |
| Example 30 Prod. | 10.0 | — | — | — | 8.0 | 7.0 | — | — | — | — | — | — |
| Example 36 Prod. | — | — | 10.0 | — | — | — | — | — | 8.0 | 7.0 | — | — |
| Placcel FM-2 | — | 10.0 | — | — | — | — | 8.0 | 7.0 | — | — | — | — |
| Placcel FM-1 | — | — | — | 10.0 | — | — | — | — | — | — | 8.0 | 7.0 |
| TMP Triacrylate | — | — | — | — | — | 1.0 | — | 1.0 | — | 1.0 | — | 1.0 |
| UVITHANE 893 | — | — | — | — | 2.0 | 2.0 | 2.0 | 2.0 | 2.0 | 2.0 | 2.0 | 2.0 |
| Irgacure 184 | 0.40 | 0.40 | 0.40 | 0.40 | .40 | .40 | .40 | .40 | .40 | .40 | .40 | .40 |
| L-5410 | 0.05 | 0.05 | 0.05 | 0.05 | .05 | .05 | .05 | .05 | .05 | .05 | .05 | .05 |
| Properties After Cure | | | | | | | | | | | | |
| Acetone Double Rubs | 6 | 2 | 18 | 2 | 40 | >100 | 2 | 20 | 45 | >100 | 2 | >100 |
| Pencil Hardness | — | — | — | — | — | HB | — | — | — | H | — | 2B |
| % X-Hatch Adhesion | — | — | — | — | — | 100 | — | — | — | 100 | — | 100 |
| Gardner Impact | | | | | | | | | | | | |
| Direct, in. lbs | — | — | — | — | — | 25 | — | — | — | 25 | — | 25 |
| Reverse, in. lbs | — | — | — | — | — | 25 | — | — | — | 25 | — | 15 |

NOTE:
The Example 30 product is the reaction product of one equivalent of Placcel FM-2 and one equivalent of maleic anhydride, and the Example 31 product is the reaction product of one equivalent of Placcel FM-1 and one equivalent of maleic anhydride.

These results indicate that the cured compositions containing a product of this invention have improved properties over similar compositions that have this product deleted and replaced with the starting caprolactone acrylate. Properties such as solvent resistance, hardness, and impact resistance are improved. In those instances where properties other than solvent resistance (Acetone Double Rubs) were not determined, the coatings were not deemed as being of sufficient merit to warrant further investigation. It should be kept in mind that the above examples are examples that demonstrate that properties are different (i.e., improved when the compounds of this invention are used) rather than working examples of optimized systems or systems that might be used in commercial practice. However, this statement is not meant to imply that the examples are without merit nor that they could not be used in commercial practice.

EXAMPLE 73

This example demonstrates that low temperatures can be used to prepare the compositions of this invention. In this example, the reaction was carried out at 65° to 70° C.

Thirty-two and six-tenths grams of maleic anhydride and 114.6 grams of M-100 caprolactone acrylate [0.33 equivalent of each] were placed in a four-neck, glass reaction flask equipped with a thermometer, a stirrer, an air inlet and an air outlet. The reactants were heated at 65°–70° C. for three hours, during which time the reactants were blanketed with an air flow. After this reaction time, the product was cooled and stored. It had a viscosity of 314 cp at 25° C., a Gardner color of 2, and an acid number of 125.

Examples 74, 75 and Examples 76 and 77

Examples 74 and 75, shown in Table X, deal with the preparation of carboxyl-terminated caprolactone acrylates that are prepared from mixtures of anhydrides.

The same equipment as described in the previous example was used. The reactor contents, listed below, were heated to 125° C. to solubilize the anhydrides and then lowered to 100° C. and maintained at that temperature for 13 hours. After that time the reaction product was cooled to room temperature, properties were determined, and used in radiation cure systems.

TABLE X

| | Example | |
|---|---|---|
| | 74 | 75 |
| Ingredients | | |
| Itaconic Anhydride | 28 | 18.7 |
| Maleic Anhydride | — | 16.3 |
| Phthalic Anhydride | 37 | 24.6 |
| M-100 | 172 | 172 |
| Properties of Reaction Product | | |
| Acid Number | 134 | 125 |
| Viscosity, cp (25° C.) | 1586 | 908 |

In Examples 76 and 77, the radiation-cure coating systems were formulated from the ingredients shown in Table XI by placing the compounds in amber colored glass bottles, mixing well, and then coating onto Bonderite 37 steel panels with a #20 wire-wound rod. They were then cured with a 300 watt/inch Fusions Systems ultraviolet light source at a rate of 10 fpm.

TABLE XI

|  | Example | |
|---|---|---|
|  | 76 | 77 |
| Ingredients |  |  |
| Example 74 Product | 10.0 | — |
| Example 75 Product | — | 10.0 |
| Irgacure 184 | 0.50 | 0.50 |
| L-7604 | 0.04 | 0.04 |
| Properties of UV-cured Coatings |  |  |
| Acetone Double Rubs | 30 | 38 |
| Pencil Hardness | 5B | 5B |
| % Crosshatch Adhesion | 100 | 100 |
| Gardner Impact, inch-pounds |  |  |
| Direct | 200 | 100 |
| Reverse | 100 | <50 |

This demonstrates that the adducts respond to ultraviolet light cure and that they have utility in radiation curable coatings, adhesives, inks, and sealants.

EXAMPLES 78-85

These examples demonstrate that the compounds of this invention can be combined with urethane acrylates and other acrylates to improve coating properties such as hardness and impact resistance. In addition, the examples point out that the compounds of this invention give improvements over those obtained when M-100, a caprolactone acrylate, is added to the formulation at the same level.

The ingredients shown in Table XII were placed in amber colored glass bottles, mixed, and coated onto Bonderite 37 steel panels with a #20 wire-wound rod. The liquid coatings were then cured with a 300 watt/inch Fusion systems ultraviolet light source at 50 feet per minute.

TABLE XII

|  | Example | | | | | | | |
|---|---|---|---|---|---|---|---|---|
|  | 78 | 79 | 80 | 81 | 82 | 83 | 84 | 85 |
| Ingredients |  |  |  |  |  |  |  |  |
| Example 21 Product | — | — | 3.24 | — | 2.00 | — | 3.00 | — |
| Example 29 Product | — | — | — | — | — | — | — | 3.00 |
| Cargill XP-1512* | 9.8 | 6.54 | 6.54 | 6.54 | 6.54 | 5.00 | 5.00 | 5.00 |
| TMP Triacrylate | — | — | — | 1.24 | 1.24 | 1.78 | 1.78 | 1.78 |
| M-100 | — | 3.24 | — | 2.00 | — | 3.00 | — | — |
| Vicure 10** | 0.20 | 0.20 | 0.20 | 0.20 | 0.20 | 0.20 | 0.20 | 0.20 |
| Properties After Cure |  |  |  |  |  |  |  |  |
| Double Acetone Rubs | >100 | 40 | 50 | 60 | >100 | >100 | >100 | >100 |
| Pencil Hardness | HB | 2B | HB | 3B | HB | 2B | F | HB |
| Impact Resistance |  |  |  |  |  |  |  |  |
| Direct, in. lbs. | <5 | 10 | 25 | 10 | 50 | <5 | <5 | <5 |
| Reverse, in. lbs. | 25 | 25 | 75 | 50 | 50 | 50 | 50 | 50 |

*An acrylate-functional, aliphatic urethane acrylate solution. It contains 75% of a urethane acrylate oligomer and 25% 1,6-hexanediol diacrylate. It is sold by Cargill Inc.
**A benzoin ether photosensitizer that yields free radicals when exposed to ultraviolet light radiation. It is sold by Stauffer Chemical Company.

Thus, addition of the products of this invention to other acrylates and mixtures of acrylates can improve the impact resistance and improve or not alter the hardness of the starting urethane acrylate. In contrast, addition of M-100 causes a decrease in coating hardness and less of an improvement in impact resistance. It is worth pointing out that it is necessary to add a reactive diluent, such as the products of this invention, to the urethane acrylate to decrease viscosity and improve coating application characteristics. As supplied, the urethane acrylate has a viscosity of 19,500 cp at 20° C. and 3,800 cp at 37.8° C. (manufacturer's specification).

EXAMPLE 86

This example describes the preparation of a carboxyl-terminated caprolactone acrylate wherein only 90 mole or equivalent percent of the anhydride is used. The example is not meant to limit the amount of anhydride that can be used in the practice of the invention.

To a 500 ml. glass reaction flask, 44.1 grams (0.45 equivalent) of maleic anhydride and 172.0 grams (0.50 equivalent) of M-100 caprolactone acrylate were added. The reaction flask was equipped with a stirrer, a thermometer, an air inlet and an air outlet. The reactants were heated to 90° C. and held there for two hours. After this time period the reactants were cooled to room temperature and stored for future use. Analysis indicated that the residue product had a Gardner Color of 1.0 and a viscosity of 374 cp at 25° C.

Ten grams of the above product were combined with 0.5 g of Irgacure 184 photoinitiator and 0.04 g of L-7604 surfactant. They were well mixed and then cast onto Bonderite steel panels with a #20 wire-wound rod. The liquid coating was cured by passing it twice under a 300 watt/inch Fusion Systems ultraviolet light source at 10 feet per mixture. Analysis indicated that the coating had a rating of 30 acetone double rubs, <6B pencil hardness, 100% crosshatch adhesion, a direct impact resistance of 150 in. lbs., and a reverse impact resistance of 125 in. lbs.

EXAMPLE 87

An epsilon-methyl-epsilon-caprolactone adduct of 2-hydroxyethylacrylate was prepared by placing 128 grams of epsilon-methyl-epsilon caprolactone in a 250 cc, four-necked glass reaction flask equipped with a stirrer, thermometer, an air inlet and an air outlet. This compound was heated to 130° C. and 58 grams of 2-hydroxyethylacrylate, 0.009 gram of stannous octanoate, and 0.06 gram of the monomethylether of hydroquinone were slowly added. After the addition, the temperature dropped to 110° C. The mixture was then heated to 130° C. and held at this temperature for 14 hours. During this reaction time, an air sparge was maintained. After the reaction time had elapsed, the product, an epsilon-methyl-epsilon-caprolactone acrylate, was cooled to room temperature and stored.

Seventy-four and four-tenths grams of the lactone acrylate prepared above and 18.62 grams of maleic anhydride were placed in a four-neck, 250 cc glass reaction flask and heated to 90° C. An air sparge was used during the reaction. The temperature was maintained at 90° C. for two hours, after which time the product, an anhydride-capped methyl-caprolactone acrylate, was cooled to room temperature and stored. To 4.78 grams of this product, 0.20 gram of Irgacure 184 photoinitiator and 0.025 gram of L-5410 surfactant were added. These compounds were well mixed and then drawn down on Bonderite 37 steel panels with a #20 wire-wound rod. They were cured by exposing them five times to a Fusion Systems 300 watt/inch light source at 10 feet per minute. The cured coatings had the following characteristics: 30 acetone double rubs, 6B pencil hardness, 100% crosshatch adhesion, and 320 in. lbs direct and reverse Gardner impact resistance.

EXAMPLE 88

A maleic anhydride-capped caprolactone acrylate was prepared from 172.0 grams of M-100 caprolactone acrylate and 49.0 grams of maleic anhydride by using the same equipment, reaction conditions, and reaction times as were used in Example 86. The final product had a viscosity of 402 cp at 25° C. The product was stored for later usage.

EXAMPLES 89 to 97

These examples further demonstrate that the compounds of this invention can be combined with urethane acrylates to improve the hardness of coatings. In addition, the examples point out that the maleic anhydride-terminated caprolactone acrylates give improvements over those obtained when M-100, a caprolactone acrylate, is added to the formulation at the same level.

The ingredients listed in Table XIII were placed in amber colored glass bottles, mixed, and coated onto Bonderite 37 steel panels with a #20 wire-wound rod. The liquid coatings were then cured with a 300 watt per inch Fusion systems ultraviolet light source at 10 feet per minute.

ing lactone acrylate was cooled to room temperature and stored. The resulting product solidified into a crystalline mass. This product will be referred to as Example 98 Control Product in the following.

Twenty grams of Example 98 Control Product and 4.9 grams of maleic anhydride were placed in the reaction flask described in the previous paragraph and heated to 90° C. The ingredients were maintained at this temperature for two hours while maintaining an air sparge. The product was then cooled to room temperature and stored for further use. This product will be referred to as Example 98 Product in the following experimentation.

The ingredients shown in Table XIV were placed in amber colored glass bottles, well mixed, and coated onto Bonderite 37 steel panels with a #20 wire-wound rod. The liquid films were cured in a 300 watt per inch Fusion Systems ultraviolet light source at 10 feet per minute.

TABLE XIV

|  | Run A | Run B |
|---|---|---|
| Ingredients |  |  |
| Example 98 Control Product | 4.78 | — |
| Example 98 Product | — | 4.78 |
| Irgacure 184 | 0.20 | 0.20 |
| L-5410 | 0.025 | 0.025 |
| Properties After Cure |  |  |
| Double Acetone Rubs | 22 | 20 |
| Pencil Hardness | <6B | 5B |
| % Crosshatch Adhesion | 100 | 100 |
| Gardner Impact |  |  |
| Direct, in. lbs. | 150 | 275 |
| Reverse, in. lbs. | 50 | 200 |

These data demonstrate that the products of this invention have improved physical characteristics over those of the starting lactone acrylate which is an eta-caprololactone acrylate in this example.

EXAMPLE 99

The following ingredients were placed in a 250 cc glass, four-necked reaction flask that was equipped with

TABLE XIII

|  | Example |  |  |  |  |  |  |  |  |
|---|---|---|---|---|---|---|---|---|---|
|  | 89 | 90 | 91 | 92 | 93 | 94 | 95 | 96 | 97 |
| Ingredients |  |  |  |  |  |  |  |  |  |
| Example 86 Product | 2.67 | — | — | 1.67 | — | — | 3.50 | — | — |
| Example 88 Product | — | 2.67 | — | — | 1.67 | — | — | 3.50 | — |
| M-100 | — | — | 2.67 | — | — | 1.67 | — | — | 3.50 |
| Cargill XP-1512 | 7.00 | 7.00 | 7.00 | 7.00 | 7.00 | 7.00 | 4.00 | 4.00 | 4.00 |
| TMP-Triacrylate | — | — | — | 2.00 | 2.00 | 2.00 | 2.17 | 2.17 | 2.17 |
| Irgacure 184 | 0.30 | 0.30 | 0.30 | 0.30 | 0.30 | 0.30 | 0.30 | 0.30 | 0.30 |
| L-5410 | 0.05 | 0.05 | 0.05 | 0.05 | 0.05 | 0.05 | 0.05 | 0.05 | 0.05 |
| Properties After Cure |  |  |  |  |  |  |  |  |  |
| Double Acetone Rubs | >100 | >100 | >100 | >100 | >100 | >100 | >100 | >100 | >100 |
| Pencil Hardness | 3H | 3H | H | 3H | 4H | F | 2H | 2H | H |
| Impact Resistance |  |  |  |  |  |  |  |  |  |
| Direct, in. lbs. | 150 | 75 | 125 | 25 | 25 | 50 | 25 | 25 | 25 |
| Reverse, in. lbs. | 125 | 75 | <75 | <10 | <10 | <10 | <5 | <5 | 5 |

EXAMPLE 98

Eta-caprlolactone (21.0 grams), 2-hydroxyethylacrylate (8.53 grams), stannous octanoate (0.003 gram), and the monomethylether of hydroquinone (0.02 gram) were placed in a 250 cc glass, four-necked reaction flask equipped with a stirrer, thermometer, an air inlet and an air outlet. These ingredients were heated at 130° C. for 8 hours while an air sparge was maintained. The resulta stirrer, thermometer, and an air inlet and outlet.

| Epsilon-methyl-epsilon-caprolactone | 128.00 g |
|---|---|
| 2-Hydroxyethylacrylate | 29.00 g |
| Stannous Octanoate | 0.15 g |
| Monomethylether of hydroquinone | 0.05 g |

These ingredients were heated to 130° C. and reacted at this temperature for 38 hours. An air sparge was maintained throughout the reaction period. The reactant product was then cooled to room temperature and stored for future use. It had a viscosity of 218 cp at 25° C.

EXAMPLE 100

94.20 grams of the Example 99 product, a methylcaprolactone acrylate, and 13.23 grams of maleic anhydride were placed in a 250 cc, glass, four-necked reaction flask equipped with a stirrer, thermometer, an air inlet and an air outlet. These ingredients were heated to 90° C. and held at this temperature for two hours. After this time the carboxyl-terminated caprolactone acrylate was cooled to room temperature and stored for further use. It had a viscosity of 434 cp at 25° C.

EXAMPLES 101–104

The ingredients given in Table XV were placed in amber colored glass bottles, well mixed, and coated onto Bonderite 37 steel panels with a #20 wire-wound rod. They were then cured with three passes under a 300 watt per inch Fusion Systems ultraviolet light source at 10 fpm.

TABLE XV

|  | Example | | | |
| --- | --- | --- | --- | --- |
|  | 101 | 102 | 103 | 104 |
| Ingredients | | | | |
| Example 99 Product | 5.0 | 2.5 | — | — |
| Example 100 Product | — | — | 5.0 | 2.5 |
| TMP-triacrylate | — | 2.5 | — | 2.5 |
| Irgacure 184 | 0.15 | 0.15 | 0.15 | 0.15 |
| L-5410 | 0.025 | 0.025 | 0.025 | 0.025 |
| Cured Properties | | | | |
| Double Acetone Rubs | 8 | >100 | 20 | >100 |
| Pencil Hardness | * | HB | <6B | 2H |
| % Crosshatch Adhesion | * | 95 | 100 | 100 |
| Gardner Impact | | | | |
| Direct, in. lbs. | * | 10 | 320 | 15 |
| Reverse, in. lbs. | * | <5 | 320 | <5 |

*Cured coating was somewhat tacky and full testing was not carried out. The glass transition temperature of the amorphous coating was below room temperature and therefore coating would not cure to a tack-free coating.

The above results further demonstrate that the cured products of this invention have improved hardness and impact resistance over those of the corresponding lactone acrylate.

EXAMPLE 105

This example describes the preparation of a copolymeric, epsilon-methyl-epsilon-caprolactone/epsilon-caprolactone, caprolactone acrylate and the corresponding anhydride-capped adduct of said caprolactone acrylate.

The following ingredients were placed in a 250 cc glass, four-necked reaction flask that was equipped with a stirrer, thermometer, an air inlet and an air outlet.

| Epsilon-methyl-epsilon-caprolactone | 38.4 g |
| --- | --- |
| Epsilon-caprolactone | 79.8 g |

These ingredients were heated to about 50°–60° C. and, while agitating and sparging with air, the following ingredients were added.

| 2-Hydroxyethyl acrylate | 58.00 g |
| --- | --- |

-continued

| Dibutyl-tin-dilaurate | 0.05 g |
| --- | --- |
| Stannous octanoate | 0.05 g |
| Monomethylether of hydroquinone | 0.06 g |

The ingredients were heated to 130° C. and held at this temperature for 11 hours while stirring and sparging with air. After this time, the reaction product, Product P, was cooled to room temperature and stored for later use.

Eighty grams of Product P and 21.1 grams of maleic anhydride were placed in the above described reactor and heated to 90° C. The reactants were held at this temperature for two hours and the resulting anhydride-capped caprolactone acrylate was cooled to room temperature and recovered as a residue product.

EXAMPLE 106

This example illustrates the preparation of the acetate of TONE Monomer M-100.

One hundred grams of M-100 caprolactone acrylate were placed in a 250-milliliter, four-neck glass reaction flask that was equipped with a thermometer, stirrer, air inlet/outlet, and 26.7 grams of acetic anhydride were placed in a glass feeding tank that was attached to the reaction flask. About one-fourth of the acetic anhydride was added to the M-100. Since no exotherm occurred, a second one-fourth of the acetic anhydride was added. Since no exotherm occurred, the system was heated to 50°–60° C. and held at this temperature while the remaining acetic anhydride was added. The reactants were then held at 50°–60° C. for two hours, after which time the temperature was raised to 100° C. The resulting product was allowed to cool to room temperature and then vacuum stripped for 45 minutes. This product was then washed four times with distilled water, dried and stored. The product had a viscosity of 70 cp at 25° C.

EXAMPLES 107–109

The ingredients listed in Table XVI were placed in amber-colored glass bottles, mixed well, and coated onto Bonderite #37 steel panels with a #20 wire-wound rod. They were then cured by exposure to a 300 watt-/inch, Fusion Systems ultraviolet light source.

TABLE XVI

|  | Example | | |
| --- | --- | --- | --- |
|  | 107 | 108 | 109 |
| Ingredients | | | |
| Product of Example 106 | 9.65 g | 3.00 g | 2.00 g |
| TMP triacrylate | — | 7.00 g | 7.00 g |
| Irgacure 184 | 0.40 g | 0.40 g | 0.40 g |
| L-7604 | 0.04 g | 0.04 g | 0.04 g |
| EX. 889 Product | — | — | 1.00 g |
| Properties After Cure | | | |
| Double Acetone Rubs | 15 | 100* | 100* |
| Pencil Hardness | 6B | 3H | 3H |
| % Crosshatch Adhesion | 10 | 100 | 100 |
| Gardner Impact, In. lbs. | | | |
| Direct | 320* | 10 | 10 |
| Reverse | 320* | 5** | 5** |

*Property was greater than value indicated, but this is the highest value that was measured.
**Property was less than the value indicated, but this is the lowest value that could be measured.

Although the invention has been described in its preferred forms with a certain degree of particularity, it is understood that the present disclosure has been made only by way of example and that numerous changes can

We claim:
1. A polymerizable monomer having the structure:

$$CH_2=CRCO_2R'-O[COR''-O]_mCOR'''-[COOH]_z$$

wherein R is H, methyl or ethyl, R' is an alkylene radical having 2 to about 12 carbons, R" is an alkylene radical having about 1 to about 10 carbons, R''' is a radical having 2 to about 20 carbons, m is an integer having a value of 1 to about 20, and z is an integer having a value of 1 to about 4.

2. Monomer claimed in claim 1 wherein R is H, R' is ethylene, R" is pentylene and R''' is —CH=CH—, and z is 1.

3. Monomer claimed in claim 1 wherein R is $CH_3$—, R' is ethylene, R" is pentylene, and R''' is —CH=CH—, and z is 1.

4. Monomer claimed in claim 1 wherein R''' is phenylene.

5. Monomer claimed in claim 1 wherein R is H, R' is ethylene, R" is 1-methyl-pentylene, and R''' is —CH=CH—, and z is 1.

6. Monomer claimed in claim 1 wherein R is H, R' is ethylene, R" is a mixture of pentylene and 1-methyl-pentylene, R''' is —CH=CH—, and z is 1.

7. Monomer claimed in claim 1 wherein R is H, R' is ethylene, R" is octylene, and R''' is —CH=CH—, and z is 1.

8. Monomer claimed in claim 1 wherein R''' is cyclohexylene.

9. Monomer claimed in claim 1 wherein R''' is methyl tetrahydrophenylene.

10. Monomer claimed in claim 1 wherein R''' is —$CH_2$C(=$CH_2$)—.

11. Monomer claimed in claim 1 wherein m is 1 to about 10, and z is 1 to 2.

12. Monomer claimed in claim 1, wherein m is 1 to about 10.

* * * * *

UNITED STATES PATENT AND TRADEMARK OFFICE
CERTIFICATE OF CORRECTION

PATENT NO. : 4,786,749

DATED : November 22, 1988

INVENTOR(S) : J. V. Koleske et al.

It is certified that error appears in the above-identified patent and that said Letters Patent is hereby corrected as shown below:

Column 14, line 5, of Table IV "9.6" should be --19.6--.

Signed and Sealed this

Seventh Day of November, 1989

*Attest:*

JEFFREY M. SAMUELS

*Attesting Officer*     *Acting Commissioner of Patents and Trademarks*